US009268297B2

(12) United States Patent  
Yoshioka

(10) Patent No.: US 9,268,297 B2  
(45) Date of Patent: Feb. 23, 2016

(54) INDICATOR AND IMAGE FORMING APPARATUS INCORPORATING SAME

(71) Applicant: Makoto Yoshioka, Saitama (JP)

(72) Inventor: Makoto Yoshioka, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 374 days.

(21) Appl. No.: 13/863,847

(22) Filed: Apr. 16, 2013

(65) Prior Publication Data

US 2013/0302044 A1 Nov. 14, 2013

(30) Foreign Application Priority Data

May 11, 2012 (JP) ................. 2012-109118

(51) Int. Cl.
| | |
|---|---|
| *F21V 5/02* | (2006.01) |
| *G02B 7/02* | (2006.01) |
| *G03G 21/16* | (2006.01) |
| *G03G 15/00* | (2006.01) |
| *G02B 5/04* | (2006.01) |

(52) U.S. Cl.
CPC .............. *G03G 21/1695* (2013.01); *F21V 5/02* (2013.01); *G03G 15/5016* (2013.01); *G03G 21/1633* (2013.01); *G02B 5/04* (2013.01); *G02B 7/02* (2013.01); *G03G 15/55* (2013.01); *G03G 15/70* (2013.01)

(58) Field of Classification Search
CPC .... G03G 15/5016; G03G 15/55; G03G 15/70; G03G 21/1633; G03G 15/1695; G02B 6/0015; G02B 6/0016; G02B 6/0051; G02B 6/0061; G02B 6/003; G02B 5/02; G02B 7/02; G02B 5/04; F21V 33/00; F21V 33/0044; F21V 3/0048; F21V 5/02; G01D 11/28; G01D 11/24

See application file for complete search history.

(56) References Cited

U.S. PATENT DOCUMENTS

| | | | | |
|---|---|---|---|---|
| 1,553,747 A | * | 9/1925 | Cadieux | ................. G08B 5/36 340/815.49 |
| 2,148,787 A | * | 2/1939 | Thomas | .......................... 362/94 |
| 5,790,374 A | * | 8/1998 | Wong | ....................... 361/679.32 |
| 5,938,324 A | * | 8/1999 | Salmon et al. | ................. 362/555 |
| 6,065,846 A | * | 5/2000 | Kato et al. | .................. 362/23.19 |

(Continued)

FOREIGN PATENT DOCUMENTS

| | | |
|---|---|---|
| CN | 201841760 U | 5/2011 |
| JP | 5-045983 | 2/1993 |

(Continued)

OTHER PUBLICATIONS

Chinese Office Action dated Apr. 28, 2015 issued in corresponding Chinese Application No. 201310170902.5.

*Primary Examiner* — Alan Cariaso  
(74) *Attorney, Agent, or Firm* — Harness, Dickey & Pierce, P.L.C.

(57) ABSTRACT

An indicator disposed on an openably closable door disposed on a part of an exterior panel includes a light source disposed on a housing positioned in an interior of the door and a diffusion lens disposed on the door and opposed to the light source, wherein the light source is mounted on a support part disposed on the housing so that an optical axis of the light source is coincident with that of the diffusion lens. The door includes a recessed portion including a retainer, and the diffusion lens is supported in the recessed portion with the retainer pressing an external surface of the diffusion lens entirely so that the light from the light source is prevented from leaking from the surface of the door.

10 Claims, 4 Drawing Sheets

(56) References Cited

U.S. PATENT DOCUMENTS

| | | | |
|---|---|---|---|
| 6,685,351 B2 * | 2/2004 | Chen | 362/555 |
| 6,906,918 B2 * | 6/2005 | Rabinovitz | G06F 1/181 |
| | | | 211/26 |
| 7,194,185 B2 * | 3/2007 | Watanabe | 385/146 |
| 7,455,440 B2 * | 11/2008 | Nishizawa | 362/581 |
| 8,777,472 B2 * | 7/2014 | Okada | 362/602 |
| 8,801,308 B2 * | 8/2014 | Cole et al. | 400/693 |

| | | |
|---|---|---|
| 2006/0280422 A1 | 12/2006 | Kaczmarek |
| 2009/0262553 A1 * | 10/2009 | Kim ............... 362/619 |

FOREIGN PATENT DOCUMENTS

| | | |
|---|---|---|
| JP | 11-119609 | 4/1999 |
| JP | 2004-170442 A | 6/2004 |
| JP | 2006-126382 A | 5/2006 |
| JP | 2007-065395 A | 3/2007 |

* cited by examiner

INDICATOR AND IMAGE FORMING APPARATUS INCORPORATING SAME

CROSS-REFERENCE TO RELATED APPLICATION

The present application claims priority pursuant to 35 U.S.C. §119 from Japanese patent application number 2012-109118, filed on May 11, 2012, the entire disclosure of which is incorporated by reference herein.

BACKGROUND

1. Technical Field

The present invention relates to an indicator and an image forming apparatus, and more specifically relates to a mechanism to indicate where a paper jam occurs in the apparatus, and apparatus incorporating the indicator.

2. Related Art

In an image forming apparatus employing an electrophotographic method, a toner image is transferred to a sheet of recording media to obtain a printed document or a copy. The recording sheet is conveyed from a sheet feed device disposed inside the image forming apparatus to a transfer position, and to a fixing device after the transfer, after which the printed sheet is discharged.

The recording sheet is conveyed along a conveyance path, and therefore is subject to occasional defective conveyance such as a paper jam. Defective conveyance of the recording sheet is recognized by a sensor disposed in the conveyance path or by measuring the time required for the conveyance. If defective conveyance occurs, a message to that effect is displayed, prompting an operator to remove the jammed sheet from the apparatus.

When fixing a paper jam, it is useful to know the exact location of the jam. JP-H11-119609-A discloses a structure that indicates where the jammed recording sheet is located and how to take it out, and includes a liquid crystal display on a part of the control panel disposed on the exterior of the apparatus and another display on a part of the housing which is exposed when an openably closable door is opened.

In the structure disclosed above, the door is opened and the display is observed to find the defective conveyance. Without observing the display, there is no finding the paper jam quickly. Accordingly, because the jam cannot be located promptly, a long time can be taken to handle the problem. For example, if multiple covers are provided for covering different parts of the recording sheet conveyance path, it may not be clear which of the exterior panels should be opened.

To solve such a problem, it is conceivable that a display is provided on the exterior panel indicating which of the covers is to be opened. However, such an arrangement requires the addition of a power source to the display. Such modification in turn necessitates, for example, improving the mechanical rigidity of the exterior panel when disposing a drawer connector between the panel and the apparatus frame, thereby enlarging and complicating the panel structure, both of which are undesirable.

SUMMARY

The present invention provides an indicator with an uncomplicated structure to eliminate defective conveyance such as a paper jam and improve workability. The indicator disposed on an openably closable door disposed on a part of an exterior panel, includes a light source disposed on a housing positioned in an interior of the door; and a diffusion lens disposed on the door and opposed to the light source, wherein the light source is mounted on a support part disposed on the housing so that an optical axis of the light source is coincident with that of the diffusion lens.

These and other objects, features, and advantages of the present invention will become apparent upon consideration of the following description of the preferred embodiments of the present invention when taken in conjunction with the accompanying drawings.

DETAILED DESCRIPTION

Hereinafter, preferred embodiments according to the present invention will now be described with reference to the accompanying drawings.

Figure 1:
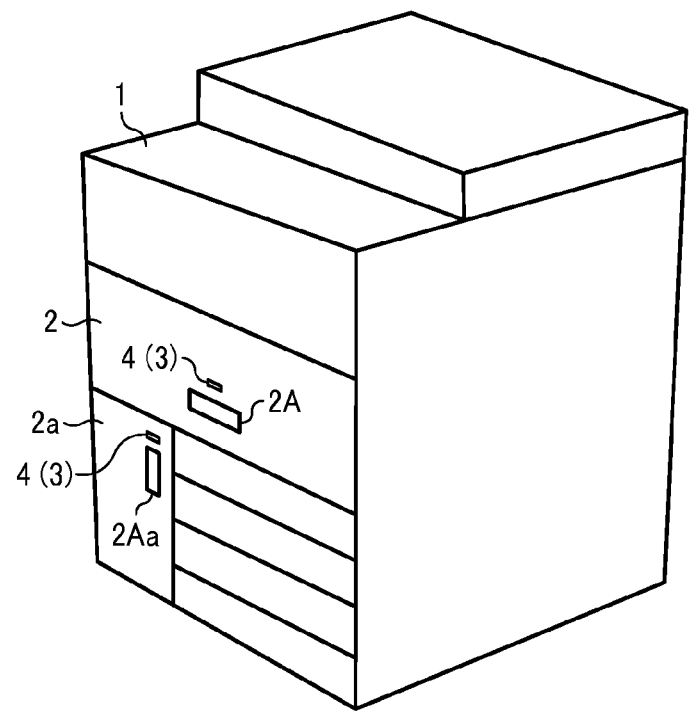
FIG. 1 is an external view of an image forming apparatus including an indicator according to an embodiment of the present invention.
Figure 2:
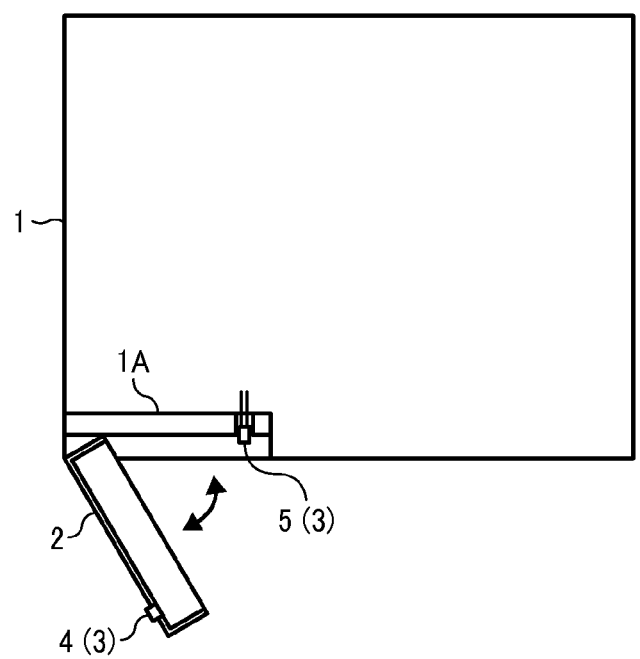
FIG. 2 is a view illustrating a status of installation of the indicator disposed on an openably closable door in the image forming apparatus of FIG. 1.

FIG. 1 is an external view of an image forming apparatus including an indicator according to an embodiment of the present invention. FIG. 2 is a view illustrating a status of installation of the indicator disposed on an openably closable door in the image forming apparatus of FIG. 1.

As illustrated in FIG. 1, the image forming apparatus 1 includes a housing 1A (shown in FIG. 2) and openably closable doors 2, 2a disposed on a part of the housing 1A. The doors 2, 2a are opened to replace any part or component included in the apparatus or to take out a sheet of recording media when a paper jam occurs.

The doors 2, 2a each include a handle 2A, 2Aa, respectively, for use in opening and closing the housing 1A. A diffusion lens 4 for use as a part of an indicator 3 is disposed in the vicinity of each of the handles 2A, 2Aa.

The indicator 3 is formed of the diffusion lens 4 positioned at a side of the doors 2, 2a as illustrated in FIG. 1 and an LED light source 5 disposed at a side of the housing 1A of the apparatus and opposed to the diffusion lens 4 as illustrated in FIG. 2.

Figure 3:
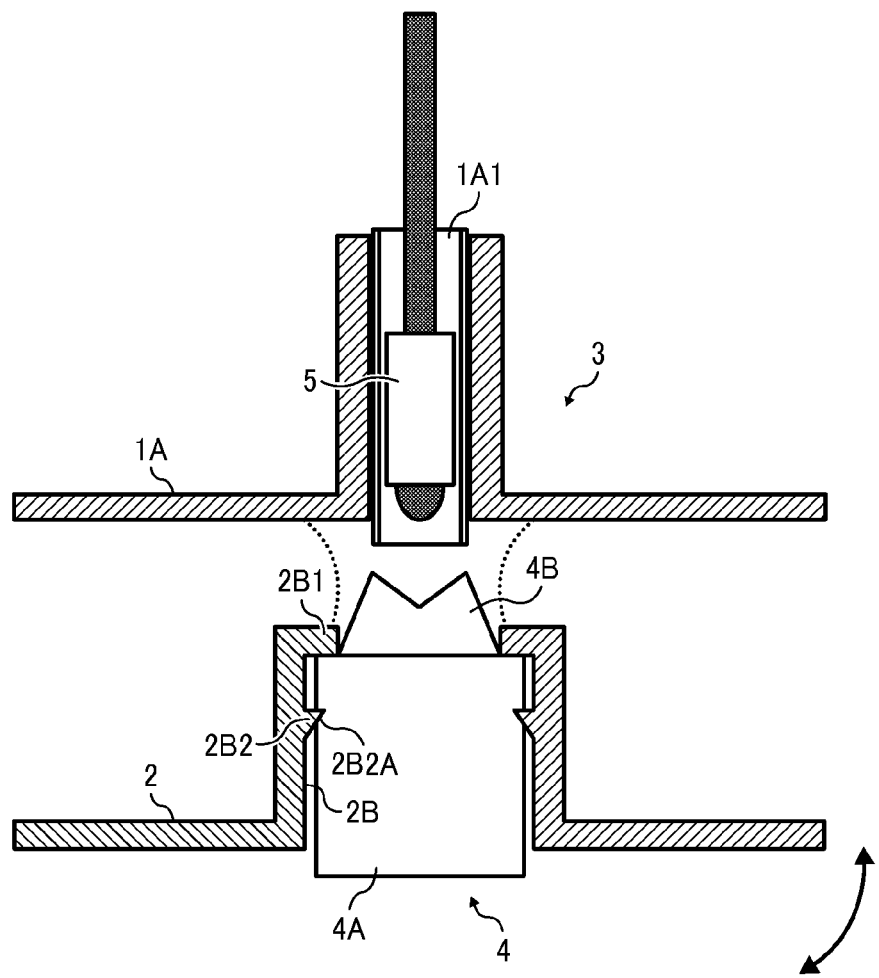
FIG. 3 is a view illustrating a main part of the indicator according to an embodiment of the present invention.

FIG. 3 is a view illustrating a main part of the indicator 3.

As illustrated in FIG. 3, the diffusion lens 4 is supported in a recessed portion 2B as a loading portion on the door 2 and the LED light source 5 is mounted on a support part 1A1, so that the optical axis of the LED light source 5 is coincident with that of the diffusion lens 4. As noted above, the indicator 3 includes the diffusion lens 4, the LED light source 5, and related parts above.

The recessed portion 2B in the side of the door 2 includes a buffer 2B1 that contacts a surface of the diffusion lens 4 opposed to the LED light source 5 so that a contact between the LED light source 5 and the diffusion lens 4 is prevented. Further, a retainer 2B2 protruding toward an external surface of the diffusion lens 4 is disposed at a position different from where the buffer 2B1 is disposed. In the configuration shown in FIG. 3, the retainer 2B2 is disposed on opposite sides of the recessed portion 2B, at right angles to the buffer 2B1.

The retainer 2B2 includes a slanted surface 2B2A of increasing height from a surface side of the door 2 toward the LED light source 5, so that resistance when the diffusion lens 4 is inserted into the door 2 is reduced and the diffusion lens 4 is held with a top of the slanted surface 2B2A pressed against the exterior of the diffusion lens 4. The retainer 2B2 is fitted along the entire exterior of the diffusion lens 4 so that the light from the LED light source 5 is prevented from leaking from the door 2. Thus, the retainer 2B2 serves as a light shielding member.

The diffusion lens 4 includes a light introducing portion 4A positioned inside the recessed portion 2B and a light incident portion 4B at a side facing the LED light source 5 and successively to the light introducing portion 4A. The light incident portion 4B includes protruding edges with wave-like shape, from a lateral view, at a side facing the LED light source 5.

With this configuration, the indicator 3 using the LED light source 5 requires no power source to be disposed at the door 2 because the door 2 requires only the recessed portion 2B for the diffusion lens 4, thereby simplifying the configuration.

In addition, the light from the LED light source 5 is incident to the wave-shaped edges so that a prism effect can be obtained. With this structure, the light can be diffused over a wide range so that the light can be recognized easily from outside the door 2.

As described above, according to the indicator 3 provided with the diffusion lens 4 disposed at each of the plurality of doors 2, 2a, lighting the LED light source 5 disposed at a predetermined portion shows where a paper jam occurs.

Figure 4:
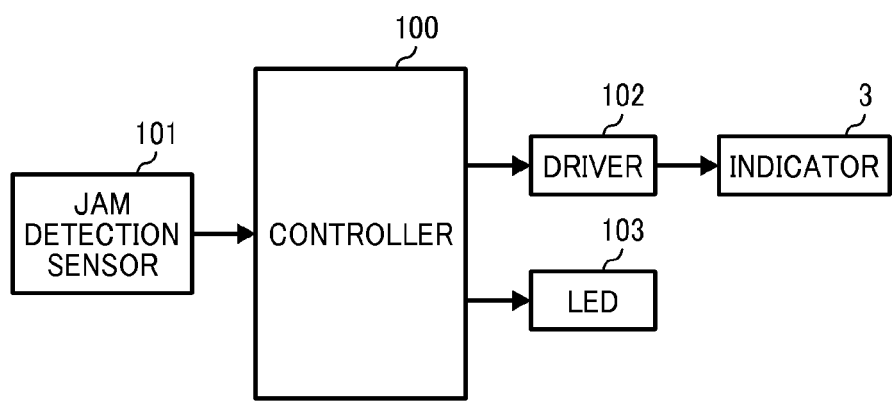
FIG. 4 is a block diagram illustrating a controller of the indicator according to an embodiment of the present invention.

In the present embodiment, a controller 100 illustrated in FIG. 4 controls operation of the indicator 3. The controller 100 also controls the image forming sequence. As a part related to the present embodiment, a jam detection sensor 101 is connected at an input side of the controller 100. A driver 102 of the indicator 3 disposed at each door and an LED 103 as an indicator, indicating a paper jam disposed for several parts in the conveyance path, are connected at an output side of the controller 100.

The jam detection sensor 101 employs a plurality of optical sensors disposed on the conveyance path of the recording sheet, deployed at intervals along the conveyance path. Determination of the occurrence of the paper jam may be performed by comparing a moving time of the recording sheet between sensor positions with a normal conveyance time previously obtained based on the paper size. Alternatively, a paper jam may be detected by directly detecting the recording sheet on the conveyance path. In the latter direct detection method, even after a removal of the recording sheet to which a paper jam has occurred, the detection can be continued.

Figure 5:
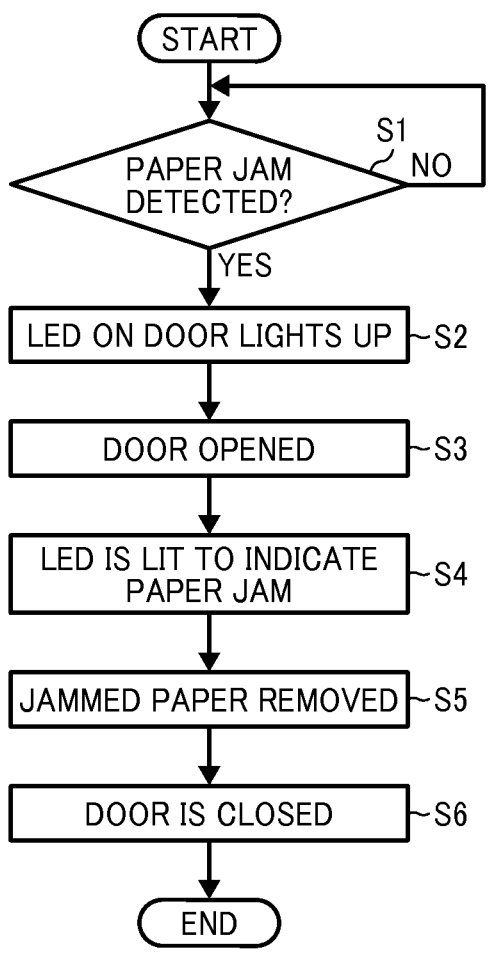
FIG. 5 is a flowchart showing operations of the controller in FIG. 4.

In the controller 100, the paper jam eliminating process is performed in steps illustrated in FIG. 5.

A signal from the jam detection sensor 101 is recognized and when a determination is made that a paper jam has occurred (Yes in step S1), a signal to light the indicator 3 disposed on the door in the vicinity of the conveyance path where a paper jam is occurring is output (S2).

When the indicator 3 is lit, the operator can easily recognize which door should be opened and opens that door. The controller 100 recognizes that one door is open (S3).

When the door is open, the LED 103 is lit to indicate a portion where the paper jam occurs in the conveyance path (S4). The operator can remove the recording sheet according to the indication. The controller 100 recognizes that the recording sheet is removed (S5).

When removal of the paper jam is completed, the door is closed and the image forming apparatus is ready for normal conveyance (S6).

Next, a modified example of the main part of the indicator will be described.

Figure 6:
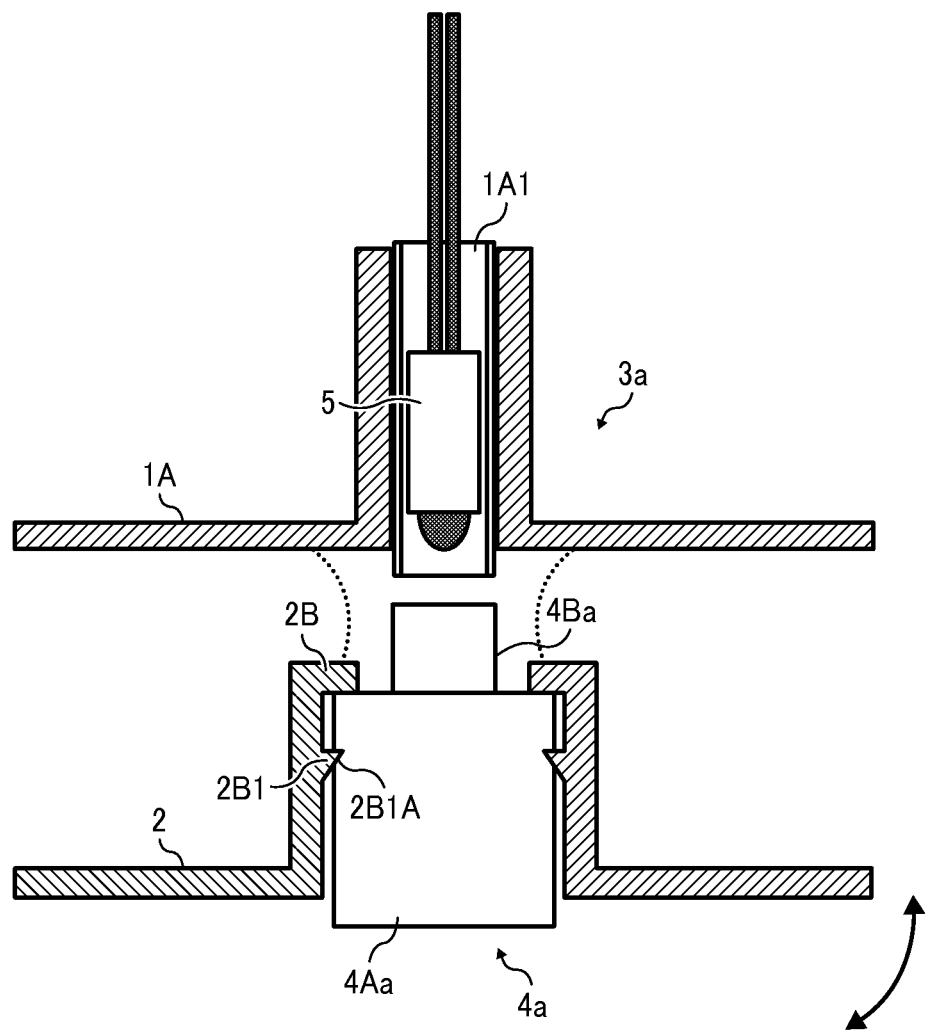
FIG. 6 is a view illustrating a modified example of a main part of the indicator in FIG. 3.

FIG. 6 is a view illustrating a main part of an indicator 3a corresponding to FIG. 3. The indicator 3a includes a diffusion lens 4a disposed on the side of the door 2 and the LED light source 5 disposed on the housing 1A opposed to the diffusion lens 4a. A surface of the diffusion lens 4a opposed to the LED light source 5 has a different shape from the example of FIG. 3. In particular, a light introducing portion 4Ba of the diffusion lens 4a has a rectangular cross section and protrudes from the diffusion lens 4a toward the LED light source 5. A tip of the light introducing portion 4Ba approaches the LED light source 5.

Configured as above, the light emitted from the LED light source 5 is easily introduced into the rectangular cross section of the diffusion lens 4a directly so that the light from the LED light source 5 does not leak outside but enters the diffusion lens 4a. With this configuration, the lighting status can be easily recognized from outside the door.

In the structures as illustrated in FIGS. 3 and 6, in order to prevent the light from the LED light source 5 from leaking outside before striking the diffusion lenses 4, 4a, a flexible cylindrical member with an interior reflecting surface can be provided to the housing side or the door side, as indicated by the broken lines in FIGS. 3 and 6.

According to the present invention, because the diffusion lens instead of the light source is disposed on the door, there is no need of power source to the side of the door. The light emitted to the diffusion lens is shielded by the retainer closely contacting the external wall of the loading portion of the door so that the light from the light source is intensively used for the indication. Thus, a simple and accurate indication can be provided when the indicator is disposed on the door.

Additional modifications and variations of the present invention are possible in light of the above teachings. It is therefore to be understood that, within the scope of the appended claims, the invention may be practiced other than as specifically described herein.

What is claimed is:

1. An indicator disposed on an openably closable door disposed on a part of an exterior panel of an image forming apparatus, comprising:
    a light source disposed on a housing positioned in an interior of the door; and
    a diffusion lens disposed on the door and opposed to the light source,
    wherein the light source is mounted on a support part disposed on the housing so that an optical axis of the light source is coincident with that of the diffusion lens, and
    wherein the diffusion lens includes a surface, opposed to the light source, to which a light from the light source is incident, and the surface has a prism shape.

2. The indicator as claimed in claim 1, wherein the door comprises a recessed portion including a retainer,
    wherein the diffusion lens is supported in the recessed portion with the retainer pressing against the entire external surface of the diffusion lens so the light from the light source is prevented from leaking from the door.

3. The indicator as claimed in claim 2, wherein the door further includes a buffer to stop a surface of the diffusion lens opposed to the light source, wherein the retainer protruding toward an external surface of the diffusion lens presses the diffusion lens and is disposed at a position different from where the buffer is disposed.

4. An indicator as claimed in claim 1, wherein the prism-shaped surface of the diffusion lens includes protruding sharp edges with a wave-like shape.

5. The indicator as claimed in claim 1, wherein a surface of the diffusion lens opposed to the light source is dimensioned to cover an area that includes all the light emitted from the light source.

6. An image forming apparatus comprising:
the housing including the external panel;
the openably closable door disposed on a part of the external panel; and
the indicator as claimed in claim 1, disposed on the door.

7. The indicator as claimed in claim 6, wherein the indicator is disposed near a handle for use in opening and closing the openable closable door.

8. The indicator as claimed in claim 1, further comprising a flexible member with an interior reflecting surface, disposed on the housing.

9. The indicator as claimed in claim 1, further comprising a flexible member with an interior reflecting surface, disposed on the openable closable door.

10. An indicator disposed on an openably closable door disposed on a part of an exterior panel of an image forming apparatus, comprising:
a light source disposed on a housing positioned in an interior of the door;
a diffusion lens disposed on the door and opposed to the light source; and
a light introducing portion having a rectangular cross section disposed on the light incident surface of the diffusion lens from the light source,
wherein the light source is mounted on a support part disposed on the housing so that an optical axis of the light source is coincident with that of the diffusion lens.

* * * * *